United States Patent [19]

Day

[11] 4,082,992
[45] Apr. 4, 1978

[54] TWIN IGNITION AND TWIN ELECTRICAL START SYSTEM FOR A VEHICLE

[76] Inventor: Oliver E. Day, R.R. No. 3, Box 414, Bonner Springs, Kans. 66012

[21] Appl. No.: 760,280

[22] Filed: Jan. 18, 1977

[51] Int. Cl.² .............................................. H02J 7/14
[52] U.S. Cl. .................................. 320/6; 307/10 BP; 320/15; 320/61
[58] Field of Search ....................... 320/5–7, 320/15, 16, 61; 307/10 B

[56] References Cited

U.S. PATENT DOCUMENTS

| | | | |
|---|---|---|---|
| 3,763,415 | 10/1973 | Ownby | 320/6 |
| 3,806,790 | 4/1974 | Marshall | 320/15 |
| 3,829,753 | 8/1974 | Marshall | 320/15 X |
| 3,949,289 | 4/1976 | Day | 320/15 X |

*Primary Examiner*—Robert J. Hickey
*Attorney, Agent, or Firm*—Spencer & Kaye

[57] ABSTRACT

A circuit arrangement for a vehicle or the like which permits either the vehicle battery or the battery of a camper connected to the vehicle to be selectively used for the ignition voltage of the vehicle engine or for the accessory voltage and which permits either the vehicle battery or the camper battery, or both of these batteries connected in parallel, to be used for energizing the starter motor of the vehicle engine. The conventional electrical system of the vehicle is modified in that a single pole double throw switch is provided for selectively connecting the battery voltage input terminal of the vehicle ignition switch to either the vehicle battery or to the camper battery; a switch is provided in the line connecting the starter control voltage output terminal of the ignition switch to the control input of the vehicle starter relay; a further starter relay is provided for connecting the camper battery to the starter motor; and a further switch is provided for connecting the starter control voltage output terminal of the ignition switch to the control input of the further starter relay. Moreover, the camper battery is connected to the alternator of the vehicle, to permit charging of the camper battery, via normally open contacts of a relay which is energized to close the contacts only when, other than during starting, a voltage is being applied to the ignition system of the vehicle.

4 Claims, 1 Drawing Figure

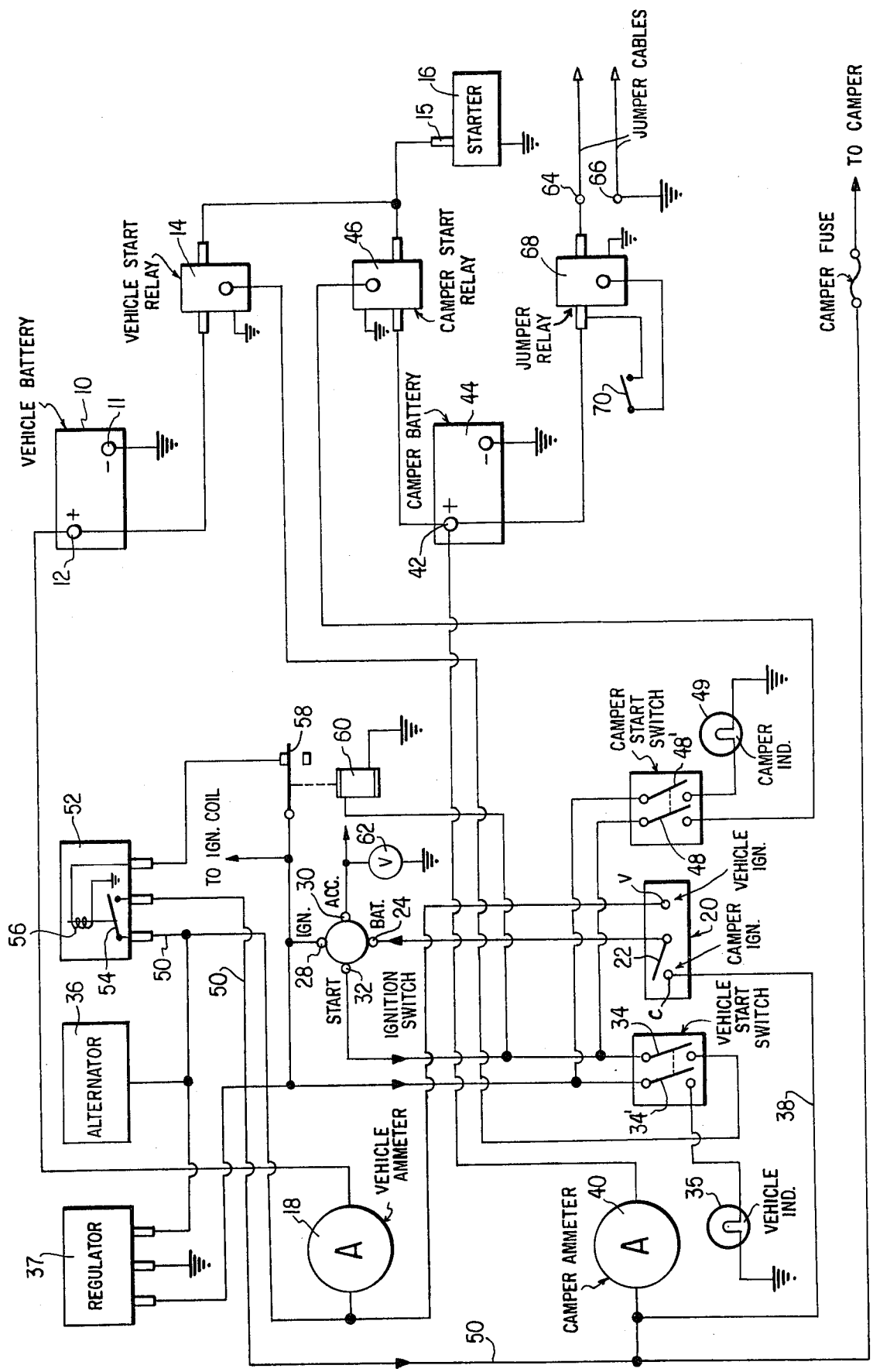

TWIN IGNITION AND TWIN ELECTRICAL START SYSTEM FOR A VEHICLE

BACKGROUND OF THE INVENTION

The present invention relates to a twin ignition and start system for a conventional motor driven vehicle. More particularly, the present invention is directed to such a system which is particularly directed to a vehicle having connected thereto a camper with a separate battery which is to be charged by the alternator or generator of the vehicle.

In the event of a stalled or disabled vehicle as a result of the vehicle battery being discharged, it is of course well known that the vehicle can be started by simply connecting a booster or auxiliary battery across the vehicle battery terminals if such a booster battery is available. In the case where a camper having a separate battery for its electrical system is connected to the vehicle, such an additional battery is obviously available and can thus be connected to the vehicle battery in the case of an emergency by means of jumper cables so as to start the vehicle. The use of jumper cables, however, has the disadvantage that once the vehicle engine is started, and it is desired to move the vehicle, the jumper cables must normally be disconnected. In such case, if the vehicle battery was simply discharged, presumably it will be subsequently recharged by the vehicle alternator, in which case there is no further problem. However, should the vehicle battery be defective, and thus not take a charge, or should the vehicle again stall before the battery is sufficiently charged so that it can again start the vehicle the jumper cables must then be reconnected in order to start the vehicle, which is obviously annoying.

SUMMARY OF THE INVENTION

It is therefore the object of the present invention to provide a simple circuit arrangement for a vehicle which is connected to a trailer or a camper with a separate battery whereby either or both of the batteries may be selectively used to start the vehicle engine and whereby either of the batteries may separately be selected to provide the ignition voltage for the vehicle engine and/or the vehicle accessory voltage.

The above object is achieved according to the invention by simple modification of a conventional vehicle ignition and starting control system including a vehicle battery having one terminal connected to ground, an alternator having its output connected to the terminal of the battery, a starter motor having one terminal connected to ground and its other terminal connected via the controlled current path of a vehicle starter relay or solenoid to the other terminal of the vehicle battery, and a conventional vehicle ignition switch having a battery voltage input terminal connected to the other terminal of the vehicle battery, an ignition voltage output terminal connected to the ignition coil, and a starter control voltage output terminal connected to the control input of the vehicle starter relay. According to the invention, the above circuit is modified in that a switch is provided in the line connecting the starter control voltage output terminal of the ignition switch to the control input of the vehicle starter relay, a single pole double throw switch is provided for selectively connecting the battery voltage input terminal of the ignition switch to either the vehicle battery or to the camper battery, a further starter relay is provided for connecting the starter to the camper battery, a further switch is provided for connecting the starter control voltage output terminal of the ignition switch to the control input of the further starter relay, and the output of the alternator is likewise connected to the camper battery via the normally open contacts of a battery protect relay which will, only, complete the connection of the alternator to the camper battery when, other than during the starting process, the ignition switch is in a position where ignition voltage is being supplied to the vehicle ignition system.

Preferably, according to the invention the battery protect relay is connected to the ignition voltage output terminal of the ignition switch via the normally closed contacts of a relay whose coil is connected to the starter voltage output terminal of the ignition switch.

With the above circuit, the position of the single pole double throw switch will determine which of the two batteries provides the ignition and/or accessory voltage for the vehicle and the closing of one or both of the switches connected to the starter relays will determine which one or whether both of the batteries will supply the starting voltage for the starter motor. Moreover, the battery protect relay in the current path between the alternator and the camper battery will disconnect the camper battery from the alternator during the starting process in order to prevent current surges from traveling between the two electrical systems, and possibly damaging same, and will moreover permit use of either battery separately as the accessory voltage when the vehicle motor is not running, i.e., when the ignition switch is switched to the accessory position.

According to a feature of the invention each of the switches for connecting the starter control voltage output terminal of the ignition switch to its associated starter relay is a double pole switch with the other pole of each of the switches being connected between the ignition voltage output terminal of the ignition switch end and a respective indicator light in order to provide a position indication of which one or both of the batteries is being used for starting.

According to still a further feature of the invention a voltmeter is connected to the accessory voltage output terminal of the ignition switch. In this manner, by switching the ignition switch to the accessory voltage position and by turning on a suitable load, e.g., by turning on the lights of the vehicle, the condition of each of the two batteries may be checked by simply changing the position of the single pole double throw switch.

BRIEF DESCRIPTION OF THE DRAWING

The FIGURE is a circuit diagram of the preferred embodiment of the twin ignition and twin electrical start system for a vehicle having a camper connected thereto according to the invention.

DESCRIPTION OF THE PREFERRED EMBODIMENT

Referring now to the FIGURE, there is shown a vehicle battery 10 having one terminal 11 thereof connected to the circuit common line which is indicated in the FIGURE as ground. As is conventional in starting systems for motor vehicles, the other terminal 12 of the vehicle battery 10 is connected via the controlled current path of a vehicle starter relay or solenoid 14, i.e. the current path containing the relay contacts, to one terminal 15 of a starter motor 16 whose other terminal is connected to ground. The terminal 12 of the vehicle battery 10 is also connected via the vehicle current indicating device, the vehicle ammeter 18 as illustrated, to one terminal V of a single pole double throw selector switch 20 whose movable contact 22 is connected to the battery voltage input terminal 24 of a conventional automobile ignition switch 26. As is conventional, the ignition switch likewise has an ignition voltage output terminal 28 which is connected to the ignition coil, an accessory voltage output terminal 30 and a starter control voltage output terminal 32. As is well known and conventional with such ignition switches, movement of the ignition switch 26 into its "on" position connects the terminal 24 to the terminals 28 and 30, while movement thereof to the "start" position connects the terminal 24 to the terminals 28 and 32 while disconnecting the terminal 24 from the terminal 30. The starter control voltage output terminal 32 is connected via a vehicle start switch 34 to the control input of the vehicle starter relay 14, i.e., the terminal to which the coil of the relay is connected. Preferably as shown, the vehicle start switch 34 is part of a double pole switch whose other switching pole 34', when closed, connects the ignition voltage output terminal 28 to an indicator or light 35 in order to provide a positive indication that the vehicle battery 10 is connected to provide the starting voltage.

In order to charge the battery 10 during operation of the vehicle, the output of the vehicle alternator 36 is connected to the battery terminal 12 via the ammeter 18 and to a voltage regulator 37. The system thus far as described, with the exception of the presence of switches 20, 34, and 34' and light 35 is a conventional starting and ignition system for a motor vehicle.

In order to be able to simply and inexpensively connect an auxiliary battery, in particular the battery of a camper or trailer, into the above-described conventional starting and ignition system, the second terminal C of the selector switch 20 is connected via a line 38 which includes the camper current indicator or ammeter 40, if such is present, to one terminal 42 of the camper battery 44. As illustrated, the terminal 42 has the same polarity as the terminal 12 of the vehicle battery 10. As with the vehicle battery 10, the other terminal of the camper battery 44 is connected to a common line or ground. The terminal 42 of the camper battery 44 is likewise connected via the control current path of a further starter relay of solenoid 46 to the terminal 15 of the starter motor 16. The control input of the starter relay 46 is, like that of starter relay 14, connected via a switch 48 to the starter control voltage output terminal 32 of the ignition switch 26. The switch 48 is likewise part of a double pole switch whose other switching pole 48' connects the ignition voltage output terminal 28 to an indicator or light 49.

Since it is desirable to maintain the camper battery 44 fully charged if possible, according to the invention the output of the alternator 36 is additionally connected via a line 50 and the camper ammeter 40 to the terminal 42 of the camper battery 44. However, in order to prevent large surge currents from traveling between the two batteries, particularly during starting operations, which surge currents would tend to damage the ammeters and other circuitry connected thereto, a battery protect relay 52 is provided which has its contacts 54 connected in the line 50. The relay coil 56 of the relay 52 is connected between ground and the ignition voltage output terminal 28 of the ignition switch 26 via the normally closed contacts 58 of a relay whose coil 60 is connected between ground and the start voltage output terminal 32 of the ignition switch. As a result of this connection arrangement the relay coil 56 will be energized, and the contacts 54 closed so as to complete the connection through the line 50, whenever the ignition switch 26 is in its "on" position. However, when the ignition switch 26 is moved to its "start" position, the voltage at terminal 32 will energize the relay 60 to open the contacts 58 and consequently the relay 52 will be momentarily de-energized, thus disconnecting the battery 44 from the output of the alternator 36.

With the circuit thus far described, if the vehicle is to be started in the conventional manner, i.e., the battery 10 is to be used both for the ignition voltage and for the starter motor voltage, the movable contact 22 of the selector switch 20 is connected to the terminal V as illustrated and the vehicle start switch 34-34' is closed. With this arrangement, when the ignition switch 26 is turned to the "start" position, the starting relay 14 will be energized to permit current to flow from the battery terminal 12 to the starter terminal 15 to energize the starter 16, and the ignition voltage appearing at the terminal 28 as well as the starter relay control voltage appearing at the terminal 32 will likewise be derived from the battery 10. Alternatively, if it becomes necessary or desirable to utilize only the camper battery 44 for the starting and ignition of the vehicle, then the movable contact 22 of the switch 20 is simply moved so that it contacts the contact C, the vehicle start switch 34-34' is opened and the camper start switch 48-48' is closed. With this arrangement, upon a starting operation the starter relay 46 will be energized to provide the starting voltage for the starter 16 from the camper battery 44.

The switching arrangement shown in the FIGURE provides the additional advantage that if, for example, as the result of extremely cold weather, it is necessary to utilize both batteries 10 and 44 to start the vehicle, both switches 34-34' and 48-48' are closed and the selector switch 20 may be in either of its two positions. Thus the starter voltage is provided by both batteries connected in parallel while the ignition voltage is provided by only one of the two batteries. The switching arrangement according to the invention provides the further possibility of providing the starter voltage from one of the batteries while providing the ignition and control voltage for the respective starter relays from the other battery. Moreover, the switching arrangement according to the invention provides the possibility of permitting the voltage of either of the batteries 10 and 44 to be separately used as the accessory voltage for the vehicle when the vehicle engine is not running. This is accomplished simply by moving the ignition switch 26 to the "accessory" position, whereby the battery voltage terminal 24 is connected only to the accessory voltage terminal 30, and then by placing the switch 20 in the desired position to connect either battery 10 or 44 to the terminal 24. Note that during this process the connection of both batteries 10 and 44 to each other is interrupted since the relay 52 is not energized, i.e., there is no voltage present at the ignition voltage output terminal 28, and hence the voltage of the selected one of the batteries 10 and 44 is separately present at the accessory voltage output terminal 30.

As a result of the separate and selectable availability of the voltages of the two batteries at the accessory voltage terminal 30, the circuit arrangement provides for the possibility of monitoring the individual battery voltages prior to attempting to start the vehicle engine to determine if one of the batteries is weak. This is accomplished according to a further feature of the invention by connecting a voltmeter 62 to the accessory voltage terminal 30. The voltage of the individual batteries can then be observed on the meter 62 by simply switching the ignition switch 26 to the "accessory" position, by placing the switch 20 in the desired position to connect either battery 10 or 44 to the ignition switch 26, and by placing a suitable load on the thus connected battery, e.g., by turning on the vehicle headlights which are normally connected, via a separte light switch, to the battery voltage input terminal 24.

In order to permit the connection of still a further battery to the system in an easy manner in the event both of the batteries 10 and 44 are incapable of starting the vehicle, or if for some reason an additional booster voltage is required, according to a further feature of the invention a pair of terminals 64, 66 are provided to which a pair of jumper cables which are connected to a further battery (not shown) may be connected. The terminal 64 which is to be connected to the terminal of the auxiliary battery having the same polarity as the terminal 42 of battery 44, is connected via the control current path of a jumper relay 68 to the terminal 42 of battery 44. The jumper relay 68 may be energized by means of a jumper switch 70 connected between the control input of relay 68 and terminal 42 of battery 44. With the illustrated connection of the jumper switch 70, it is of course necessary that the battery 44 be able to supply sufficient voltage to energize the jumper relay 68. It is to be understood, however, that the switch 70 may equally well be connected to the terminal 12 of battery 10, the terminal 32, or even the terminal 64. The jumper switch relay 68 functions to permit a third battery to be semipermanently connected into the system, thus providing still further versatility to the circuit according to the invention.

It will be understood that the above description of the present invention is susceptible to various modifications, changes and adaptations, and the same are intended to be comprehended within the meaning and range of equivalents of the appended claims.

What is claimed is:

1. An electrical circuit arrangement for a vehicle which permits the starting voltage and/or the ignition voltage for the vehicle engine to be derived from the vehicle battery or from an attached camper battery, and which permits simultaneous charging of both batteries comprising in combination:

a vehicle battery having one terminal connected to ground; a vehicle starter relay; a starter motor having one terminal connected to ground and its other terminal connected via the controlled current path of said vehicle starter relay to the other terminal of said vehicle battery; a vehicle alternator having is output connected to said other terminal of said vehicle battery; a conventional vehicle ignition switch having a battery voltage input terminal and at least an ignition voltage output terminal which is connected to the ignition coil, and a starter control voltage output terminal; a first switch connecting said starter control voltage output terminal of said ignition switch to the control terminal of said vehicle starter relay; a camper battery having one terminal connected to ground; first circuit means, including the controlled current path of a further starter relay, for connecting the other terminal of said camper battery to said other terminal of said starter motor; a second switch connecting said starter control voltage terminal of said ignition switch to the control terminal of said further starter relay; a single pole double throw switch means, having its movable contact connected to said battery voltage input terminal of said ignition switch, for selectively connecting said battery voltage input terminal to said other terminal of said vehicle battery or said other terminal of said camper battery, whereby the position of said switch means determines which of the batteries supplies the voltage for the vehicle motor ignition coil and for control of said starter relays and the closure of one or both of said first and second switches determines which one or both of the batteries supplies the starter voltage; and, second circuit means for connecting said output of said alternator to said other terminal of said camper battery only when an output voltage is present at said ignition voltage output terminal of said ignition switch and no output voltage is present at said starter control voltage output terminal of said ignition switch.

2. A circuit arrangement as defined in claim 1 wherein said second circuit means includes: a first relay having a pair of normally open contacts connected between said output of said alternator and said other terminal of said camper battery, and a relay coil having one terminal connected to ground; and a second relay having a pair of normally closed contacts connected between the other terminal of said coil of said first relay and said ignition voltage output terminal of said ignition switch, and a relay coil connected between said starter voltage output terminal of said ignition switch and ground.

3. A circuit arrangement as defined in claim 1 wherein said ignition switch further includes an accessory voltage output terminal; and further comprising a voltmeter connected between said accessory voltage output terminal and ground.

4. A circuit arrangement as defined in claim 1 wherein each of said first and second switches is a double pole switch having one pole connected between said starter control voltage terminal of said ignition switch and the control terminal of the associated one of said vehicle and further starter relays, and its other pole connected in series with a respective indicator light between said ignition voltage output terminal of said ignition switch and ground.

* * * * *